6976X
P. C. Curtis,
Forge Back,
Patented Mar. 27, 1832.
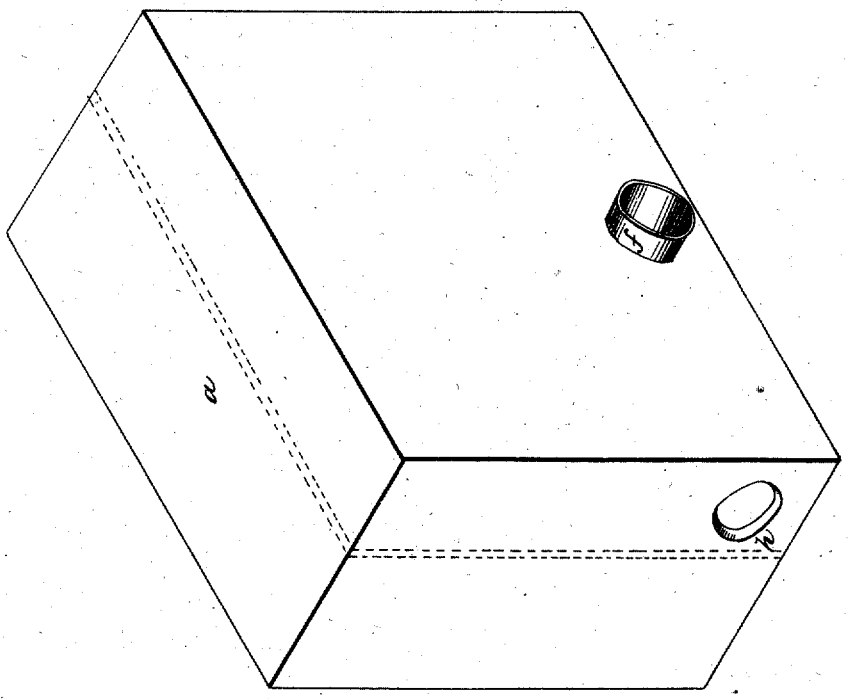
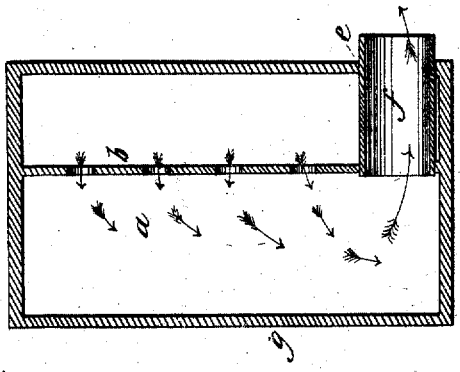
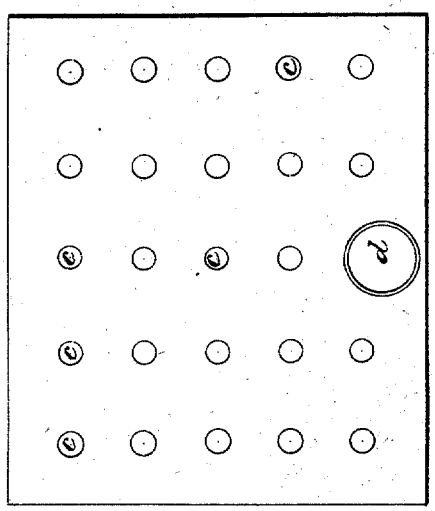
N. PETERS, PHOTO-LITHOGRAPHER, WASHINGTON, D. C.

69760X Mar. 27. 1832

Philo C. Curtis, of Utica, State of New York,

Letters Patent,

The schedule referred to in these Letters Patent and making part of the same containing a description in the words of the said Philo C. Curtis himself of his improvement in the construction of a Back in a Forge and in most other Fires when a Blast is used.

Be it known that I, Philo C. Curtis of Utica County of Oneida and State of New York have invented a new and useful improvement in the construction of a Back for a Forge, and for most other fires where a blast is used also for conveying the wind through said back, and that the following is an exact description of said Machine as invented by me —

1st. I form a box of cast iron about twelve inches in length ten inches high and six inches thick (for a common Blacksmith's fire) The box consists of three parts — The front or side exposed with which the top bottom and ends are cast comprising but one piece. The second or centre plate goes into the box lengthways in a perpendicular position and in such a manner as to leave a space of about two inches between that and the front plate. Through this plate I make a number of small holes, likewise one of about one three quarters of an inch near the bottom central lengthways of the box, I also make a hole through the front plate corresponding with the large hole in the centre plate in such a manner as to admit of a wrought iron tube or tuyere passing through both plates. The third or back part is a plain plate ten by twelve inches, which I bolt on in such a manner as to make a tight box except where the wind is introduced and where it escapes. — The wind is driven into this box through a hole in the end of the box between the front and

108

69760X Mar 27, 1832 centre plate. After which it passes through the small box in the centre plate into the space between the back and centre plate from thence through the tuyere into the fire — The advantages to be derived from this improvement are first the preservation of the back by conveying the cold air against the back of the front plate thereby carrying off the caloric that would otherwise accumulate so as to destroy the metal — Secondly the heat or caloric which in ordinary cases is wasted is by this method taken up and conveyed into the fire in consequence of which the quantity of coal is very much reduced in accomplishing the same work. — The form and size of the above described box may be varied. But what I claim as my invention consists principally in applying the wind from the bellows against the back of a plate exposed to the fire and from thence into the fire. I likewise claim the particular form of the above described box as my invention.

Witnesses
J. W. Lyman
E. Walker

Philo Curtis

Exd
W. H. C.

[illegible]